(12) United States Patent
Hassan et al.

(10) Patent No.: US 9,883,456 B2
(45) Date of Patent: Jan. 30, 2018

(54) APPLICATION SPECIFIC INTERNET ACCESS

(71) Applicant: Microsoft Technology Licensing, LLC, Redmond, WA (US)

(72) Inventors: Amer Hassan, Kirkland, WA (US); Aaron Cunningham, Redmond, WA (US); Billy Anders, Bothell, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 14/855,853

(22) Filed: Sep. 16, 2015

(65) Prior Publication Data

US 2017/0078962 A1    Mar. 16, 2017

(51) Int. Cl.
| | |
|---|---|
| *H04W 52/02* | (2009.01) |
| *G06F 17/30* | (2006.01) |
| *G06F 3/0484* | (2013.01) |
| *G06F 3/0482* | (2013.01) |
| *H04L 29/08* | (2006.01) |

(Continued)

(52) U.S. Cl.
CPC ...... *H04W 52/0209* (2013.01); *G06F 3/0482* (2013.01); *G06F 3/04842* (2013.01); *G06F 17/30575* (2013.01); *H04L 67/1095* (2013.01); *H04W 76/02* (2013.01); *H04W 76/023* (2013.01); *H04W 88/04* (2013.01); *Y02B 60/50* (2013.01)

(58) Field of Classification Search
CPC ........... H04W 52/0209; H04W 76/023; H04W 76/02; H04L 67/1095; G06F 17/30575
See application file for complete search history.

(56) References Cited

U.S. PATENT DOCUMENTS

| | | | |
|---|---|---|---|
| 7,583,401 B2 * | 9/2009 | Lewis ................. | G06F 21/10 |
| | | | 358/1.15 |
| 8,081,930 B2 | 12/2011 | Lewallen | |
| 8,364,649 B2 | 1/2013 | Holbein et al. | |

(Continued)

OTHER PUBLICATIONS

Horowitz, Paul, "10 Tips to Reduce iPhone & iPad Personal Hotspot Data Usage", Published on: Mar. 28, 2012 Available at: http://osxdaily.com/2012/03/28/tips-to-reduce-iphone-ipad-personal-hotspot-data-usage/.

(Continued)

*Primary Examiner* — Min Jung
(74) *Attorney, Agent, or Firm* — Brian T. Rivers (57) ABSTRACT

Application specific internet access for synchronizing over a tethered network connection is disclosed. When a first device enters a tethering state the first device sends a wakeup message to a second device that is in sleep mode. The second device receives the wake-up message and determines at least one application that is to be synchronized over the tethered network connection provided by the first device. The at least one application is then synchronized and the second device returns to sleep mode. The second device to which the wakeup message is sent may comprise a device that was previously paired with the first device. The at least one application to be synchronized may be determined from a database stored on the second device that indicates a subset of applications of a plurality of applications on the second device to be synchronized on entering wakeup mode in response to the wake-up message.

24 Claims, 4 Drawing Sheets

(51) Int. Cl.
*H04W 76/02* (2009.01)
*H04W 88/04* (2009.01)

(56) References Cited

U.S. PATENT DOCUMENTS

| | | | |
|---|---|---|---|
| 8,769,526 B2 | 7/2014 | Brunsman et al. | |
| 8,897,447 B1 | 11/2014 | Rohrweck | |
| 8,965,348 B1 | 2/2015 | Cronin | |
| 9,066,292 B2* | 6/2015 | O'Neill | H04W 68/00 |
| 2010/0214968 A1* | 8/2010 | Paliwal | H04B 1/707 |
| | | | 370/311 |
| 2012/0026992 A1* | 2/2012 | Navda | H04W 4/003 |
| | | | 370/338 |
| 2013/0331028 A1* | 12/2013 | Kuehnel | H04W 76/02 |
| | | | 455/41.1 |
| 2014/0024339 A1 | 1/2014 | Dabbiere et al. | |
| 2014/0086146 A1 | 3/2014 | Kim et al. | |
| 2014/0126391 A1* | 5/2014 | Liu | H04W 52/0206 |
| | | | 370/252 |
| 2014/0206346 A1 | 7/2014 | Kiukkonen et al. | |
| 2014/0259001 A1 | 9/2014 | Brunsman et al. | |
| 2014/0357269 A1 | 12/2014 | Zhou et al. | |
| 2015/0097689 A1 | 4/2015 | Logue et al. | |
| 2016/0113050 A1* | 4/2016 | Li | H04W 52/0209 |
| | | | 370/329 |
| 2016/0234690 A1* | 8/2016 | Michalski | H04W 4/06 |

OTHER PUBLICATIONS

Paul, Ian, "How to Limit Your PC's Data Usage While Tethering", Published on: Dec. 2, 2014 Available at: http://www.pcworld.com/article/2853758/how-to-limit-your-pcs-data-use-while-tethering.html.

Hoffman, Chris, "How to Restrict & Monitor Mobile Data Usage on Windows 8.1", Published on: Apr. 22, 2014 Available at: http://www.howtogeek.com/187483/how-to-restrict-monitor-mobile-data-usage-on-windows-8.1/.

Chrisoldroyd, "How to set up iTunes Wi-Fi sync for iPhone, iPad", Published on: Oct. 24, 2011 Available at: http://www.imore.com/daily-tip-set-itunes-wifi-sync-windows.

Dixit, Himanshu, "Android Tips You Must Recognize", Published on: May 16, 2014 Available at: http://hangupin.com/android-tips-you-should-know/.

"Keep Your Team Connected with Appsync", Published on: May 11, 2014 Available at: http://www.inspiringapps.com/custom/appsync/.

Ross, Guillaume, "Using Little Snitch to Save your Mobile Data Plan when Tethering", Published on: Jul. 28, 2014 Available at: http://blog.binaryfactory.ca/2014/07/using-little-snitch-to-sav-your-mobile-data-plan-when-tethering/.

"Managing your Data Usage", Published on: Apr. 19, 2014 Available at: http://www.htc.com/us/support/htc-one/howto/365709.html.

"Helium", Published on: Oct. 8, 2014 Available at: http://www.androidpit.com/app/com.koushikdutta.backup.

Hildenbrand, Jerry, "Android 101: Tethering" Published on: May 17, 2010 Available at: http://www.androidcentral.com/android-internet-tether.

Jordan, Patrick, "How to Setup Wi-Fi Sync for the iPad in iOS", Published on: Oct. 5, 2011, Available at: http://ipadinsight.com/ipad-tips-tricks/how-to-setup-wi-fi-sync-for-the-ipad-in-ios-5/.

Han, et al.,"DozyAP: Power-Efficient Wi-Fi Tethering", in Proceedings of the 10th International Conference on Mobile Systems, Applications, and Services, Jun. 25, 2012, 14 pages.

Jung, et al., "Energy Efficient Wifi Tethering on a Smartphone", in IEEE Conference on Computer Communications, Apr. 27, 2014, 9 pages.

"Wake-on-LAN", Published on: Oct. 23, 2004, Available at: http://www.jibble.org/wake-on-lan/.

"Guide Automatic Sleep and Wake-up from any Device / Location", Published on: Jan. 27, 2015, Available at: https://forums.plex.tv/index.php/topic/142744-guide-autonnatic-sleep-and-wake-up-from-any-device-location/.

"Android—How can I Wake up the Phone from a Hard Sleep to Take a Picture?", Published on: Dec. 24, 2011, Available at: http://stackoverflow.com/questions/5215367/android-how-can-i-wake-up-the-phone-from-a-hard-sleep-to-take-a-picture.

Xu, et al., "Optimizing Background Email Sync on Smartphones", in Proceedings of the 11th International Conference on Mobile Systems, Applications, and Services, Jun. 25, 2013, 14 pages.

Konik, Sebastian, "Idle Time Connection Manager", Retrieved on: Jun. 24, 2015, Available at: https://play.google.com/store/apps/details?id=com.sk.pcm2&hl=en.

Aguilar, Nelson, "How to Put Your Samsung Galaxy Note 2 in Deep Sleep Mode to Save Battery Life", Retrieved on: Jun. 24, 2015, Available at: http://galaxy-note2.wonderhowto.com/how-to/put-your-samsung-galaxy-note-2-deep-sleep-mode-save-battery-life-0142523/.

PCT International Search Report for counterpart PCT application PCT/US2016/045670, published Nov. 4, 2016.

"Second Written Opinion Issued in PCT Application No. PCT/US2016/045670", dated Aug. 3, 2017, 6 Pages.

"International Preliminary Report on Patentability Issued in PCT Application No. PCT/US2016/045670", dated Oct. 24, 2017, 7 Pages.

* cited by examiner

APPLICATION SPECIFIC INTERNET ACCESS

BACKGROUND

Mobile computing devices such as mobile telephones and tablet computers have continued to proliferate in recent years. These mobile devices may be equipped with processors, memory, and the capability to communicate through local and wide area networks, including the Internet. Current mobile devices are also capable of executing a wide range of computer programs and software applications. A user of a mobile device may have a personal computer, another mobile device, or multiple other mobile devices that each includes programs and applications. In many cases, the programs and applications on a mobile device should be updated or synchronized regularly by accessing a network or the internet to send or obtain application updates, messaging updates, or other application data updates for synchronization.

A user of multiple mobile devices may desire to update or synchronize application data on the user's devices in various device use scenarios. For example, a user of multiple mobile devices may have different service capabilities for the user's different devices. In particular situations, one of the user's devices may be able to access the internet through a cellular network or a particular Wi-Fi hotspot while the user's other devices may not have that access capability. For example, this could happen in a roaming scenario. Also, the user's multiple devices may each be intermittently switched between sleep mode and wake mode, or between on and off states, as the user switches use from one device to another device and moves about or roams while carrying one or more of the devices with them. In any of these situations, a user may desire to update or synchronize application data on the user's devices while also minimizing data usage and cost. The user may also desire to update or synchronize an application while minimizing battery power consumption on the user's mobile devices.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Systems, methods and apparatus that provide efficient application specific internet access are disclosed herein. The disclosed embodiments provide application specific internet access for synchronizing applications on a device in a multiple device environment on an opportunistic basis when a network connection becomes available.

In an embodiment, a first device enters a tethering state in which the first device is operable to provide a tethered network connection to at least one second device. When the first device enters the tethering state, the first device sends a wakeup message to at least one second device that was previously paired with the first device on a peer-to-peer interface. The first device may then provide the tethered network connection when the at least one second device that was previously paired with the first device enters the awake mode. The at least one second device may then synchronize device applications over the tethered connection. In the embodiment, the first device may comprise any type of mobile device or node that provides tethering functionality to other devices.

In another embodiment a first device receives a wakeup message from a second device operable to provide a tethered network connection while the first device is in sleep mode. In response to receiving the wakeup message, the first device may enter a wake mode, synchronize at least one application over the tethered network connection, and then return to the sleep mode. The at least one application to be synchronized may comprise a subset of a plurality of applications on the first device. The second device sending the wakeup message may be a second device with which the first device receiving the wakeup message has previously paired over a peer-to-peer interface. The first device receiving the wakeup message may set up a data channel on the peer-to-peer interface to provide the tethered network connection from the first device through the second device.

In one implementation the first device may receive input, for example user input received at a user interface, indicating at least one application to be synchronized in response to receiving a wakeup message from the second device operable to provide a tethered network connection. The indication of the at least one application to be synchronized may be stored in a data base in the first device. When the first device receives the wakeup message the first device may determine at least one application for synchronization by accessing the database and synchronize the at least one application over the tethered network connection. In other implementations the first device may synchronize the at least one application only if the tethered network connection provides a specific network type data connection. For example, in one implementation the first device may only synchronize when the tethered network connection provides a Wi-Fi connection. Alternatively, in other embodiments the second device may send a wakeup message to the first device only if the second device is able to provide a specific network type data connection, such as a Wi-Fi connection.

DETAILED DESCRIPTION

The system, method and apparatus will now be described by use of example embodiments. The example embodiments are presented in this disclosure for illustrative purposes, and not intended to be restrictive or limiting on the scope of the disclosure or the claims presented herein.

The technologies and techniques that are described herein provide embodiments of systems, methods and apparatus that provide application specific internet access. The disclosed embodiments provide application specific internet access in a multiple device environment for synchronizing device applications on an opportunistic basis. The embodiments may be configured to initiate application specific internet access for a device in situations where applications on the device are likely to benefit from updating and synchronization.

In embodiments a first device may be utilized to provide a tethered network connection to a second device while the second device is in sleep mode by sending a wakeup message to wake up the second device. The second device may then synchronize data associated with one or more applications on the second device over the network. In an implementation, the first device may be a mobile device, for example, a mobile phone that is operable to provide a tethered network connection while a user is roaming with the device. For example the first device may have access to the internet over cellular data connections or through secure Wi-Fi hotspots provided by the user's phone service provider while the user roams. The second device may be a device such as a tablet or laptop computer, or other portable/mobile device, that has more limited network connection capability while roaming. For example, it may only be practical for cost or security reasons to connect the second device directly to the network or internet when the second device is in the coverage area of a secure office network of the user's company/business or the user's home network.

The embodiments provide advantages in various situations. One advantage is provided by keeping applications on the second device updated when they would not normally be updated. When a user of the first device and the second device is roaming and traveling with both devices and both devices are intermittently used, updating the applications on the second device is problematic. For example, in situations in where a user is roaming and the second device has been in a sleep mode, the second device likely has not been accessed by the user and/or connected to the internet within a period of time. It may be likely that the period of time within which the second device has been in sleep mode is significant for keeping data associated with certain applications on the second device updated and some data may be outdated. For example, the data stored and associated with applications on the second device may be changed or outdated and need to be synchronized, or sent from the application on the second device over a network to update associated remote databases. These applications may include, for example, email or messaging applications, calendar applications, document sharing applications, news/media applications, social network applications, or any other type of applications that may with associated databases and applications located remote to the second device The application data to be synchronized may have changed at remote databases or have been changed on the second device itself during offline use of the second device subsequent to the last network access. In this situation the tethering capabilities of the first device may be advantageously utilized to synchronize applications on the sleeping second device. This may be done by configuring the first and second devices to initiate a process of synchronization for synchronizing applications on the second device when the second device is in sleep mode and the first device has entered a tethering state.

The embodiments may be utilized when the user is traveling and the first device is in and out of service coverage or unable to access service, for example when the user is traveling by airplane or vehicle. At locations where the first device has network and internet access, such as when the user powers up the first device after exiting an airplane or after exiting a bus, and comes into range of a Wi-Fi hotspot or cellular coverage, the first device enters tethering mode and a wakeup message is sent from the first device to the second device on a peer-to-peer interface. The wake-up message may be sent upon receiving a response from a user of the first device after prompting the user if the user wants to synchronize applications on the second device when entering tethering mode. The second device receives the wakeup message, wakes up, connects to the network through the tethering connection of the first device, synchronizes applications on the second device, and returns to sleep mode. Without the use of the embodiments, the application data on the second device would remain unsynchronized and not updated. In an implementation, a subset of the applications on the second device may be chosen to be selectively synchronized. The synchronization may also be set so that it is only performed if a particular type network connection is available through the tethering connection.

Selectively synchronizing a subset of all applications on the second device or only performing synchronization on a particular network upon wake up may be advantageous when data usage and resource cost is a concern. For example, the cost of using the network connection available over the tethered connection for data transfer by the second device may be a factor in deciding whether to allow use of the tethered connection for the second device. The selection of a subset of applications on the second device may also be based on data requirements and importance of the individual applications. The embodiments provide advantages in keeping application data on the second device updated that may be realized in other scenarios in which the second device may be in sleep mode and the first device may intermittently enter a tethering state.

Figure 1:
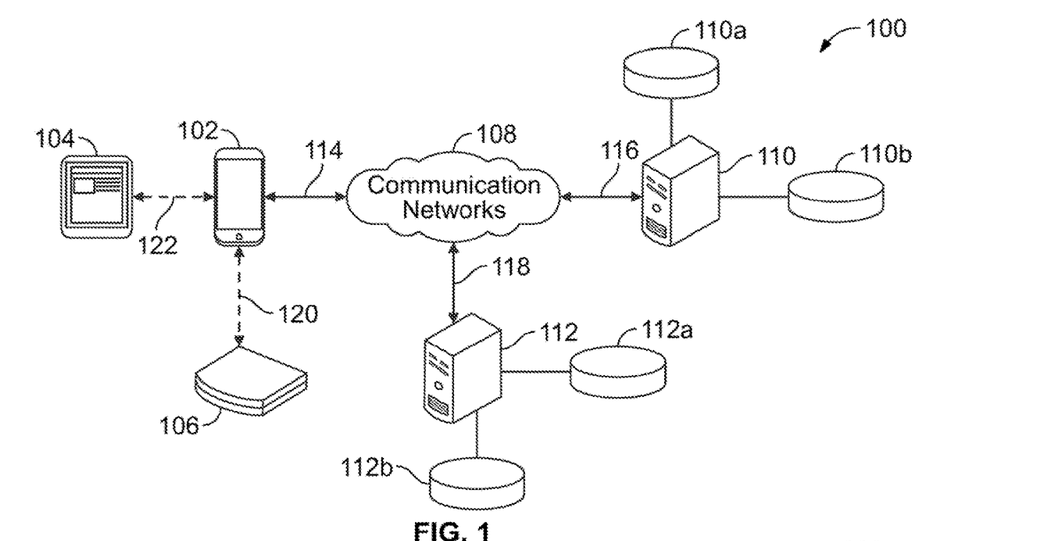
FIG. 1 illustrates a system into which devices according to an embodiment of the disclosure may be implemented.

Referring now to FIG. 1, therein is illustrated a system 100 that includes devices configured to perform application specific internet access. In FIG. 1, system 100 is shown as including communication networks 108, a server 110 that includes storage devices 110*a* and 110*b*, a server 112 that includes storage devices 112*a* and 112*b*, device 102, device 104, and device 106. The communications networks 108 provide connectivity for communications between device 102, device 104, device 106, server 110, server 112, and other devices that may be connected to communications networks 108. Server 110 and server 112 may include application programs or databases that are associated with and may be synchronized with applications on device 102, device 104 or device 106. For example, server 110 may comprise an email or messaging server that is associated with an email or messaging application on device 104. The applications on server 110 or server 112 associated with devices 102-106 may comprise any type of applications used on the devices 102-106.

Communication networks 108 may include one or more internet protocol (IP) networks comprising routers and switches for routing internet traffic carried in IP data packets and is not limited to a particular type of network. For example, communications networks 106 may include one or more wide area networks (WANs) or one or more local area networks (LANs) implemented in LAN topologies using a protocol such, for example, as Ethernet, TCP/IP, Frame Relay, Ethernet, FTP, HTTP, or a similar protocol. Communication network 114 also may include one or more wireless or landline networks that provide the network interfaces shown at interfaces 114, 116, and 118 respectively, for device 102, and servers 110 and 112 to communications network 108, so the various devices can access communication networks 108 and communicate with each other. The communications networks 108 that provide interfaces 114, 116 and 118 may be comprised of any type of network that provides an appropriate network interface. For example, interface 114 may comprise Wi-Fi channels channel provided by a Wi-Fi access point of communications networks 108. Interface 114 may also comprise any other type of interface over which communication between device 102 and communications networks maybe implemented, such as cellular channels of a GSM, WCDMA, LTE, or other type of cellular network. Device 102 may communicate with device 104 over peer-to-peer, or device-to-device, interface channel 122. Device 102 may also communicate with device 106 over peer-to-peer, or device-to-device, interface channel 120. Interface channels 120 and 122 may comprise any type of device-to device interface channels such as Wi-Fi Direct, Wi-Fi, Bluetooth, infra-red, or near field communications (NFC) interface channels. Also interfaces 116 and 118 to servers 110 and 112, respectively, may be implemented over high speed fiber optic cable that connect servers 110 and 112 to the one or more IP networks of communications networks 108.

While device 102, device 104 and device 106 are illustrated as implemented, respectively, as an example smart phone, example tablet or example laptop computer, each one of devices 102, 104 and 106 may be implemented as any type of device that may be configured with appropriate functionality supporting the embodiments of application specific internet access disclosed herein. These types of devices may include, for example, tablet computers, a laptop or desktop personal computer (PC), gaming devices, multimedia devices, smart televisions, home theater systems, a smart automobile systems, smart house systems, multimedia cable/television boxes, smart phones, accessory devices, personal digital assistants (PDAs), portable media players, portable network nodes/modems, or smart watches. Servers 110 and 112 are illustrated as single servers but each may be representative of server functions or server systems provided by one or more servers or computing devices that may be co-located or geographically dispersed. The term server as used in this disclosure is used generally to include any computing devices or communications equipment that may be implemented to perform the functions and processes of the disclosed embodiments.

In an example embodiment implemented in the system of FIG. 1, device 102 is operable to enter a tethering mode in which device 102, in certain scenarios, is operable to provide a network or internet connection to communications networks 108 over wireless interface 114 to device 104 or device 106, through device-to device interface channel 122 or 120, respectively. Device 104 or device 106 may then synchronize applications and application data over the communications network with 108, for example, server 110 or server 112.

Figure 2:
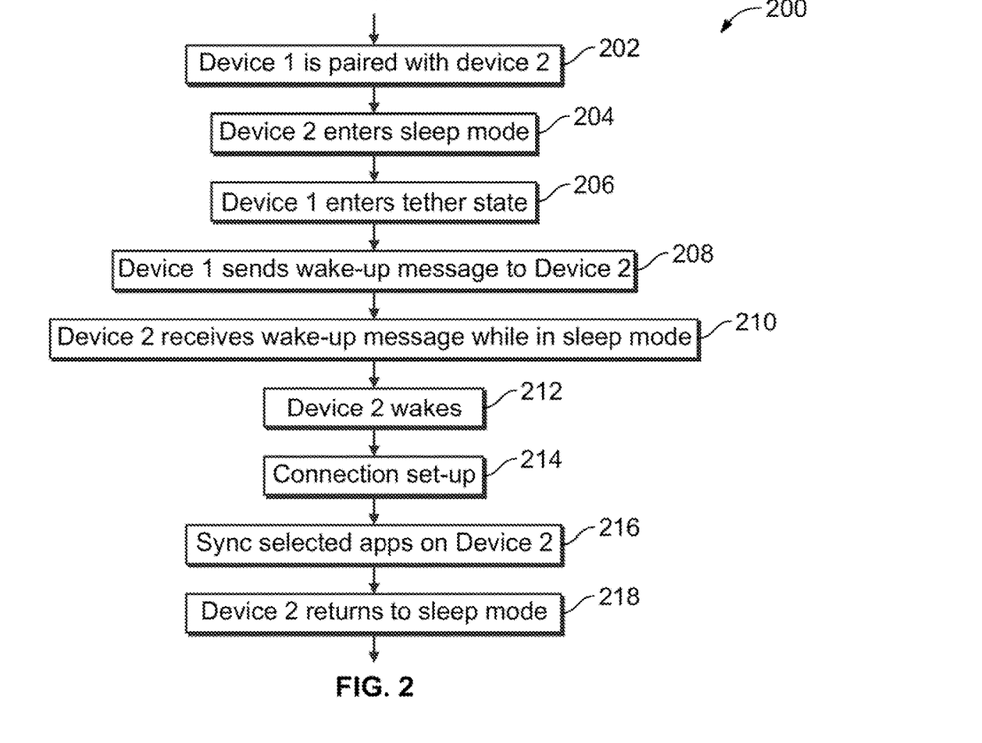
FIG. 2 is a flow diagram illustrating operations performed in example devices according to an embodiment of the disclosure.

FIG. 2 is a flow diagram of a method 200 for application specific Internet access performed in a system 100. FIG. 2 will be described with reference to FIG. 1 using device 102 and device 104 as examples of, respectively, device 1 and device 2 of FIG. 2. FIG. 2 may also apply where device 106 was implemented as device 2 of FIG. 2 or where the process of FIG. 2 was performed with device 102 as device 1 and devices 104 and 106, each separately, performing the operations of device 2 concurrently.

The process begins at 202 where device 102 is paired with device 104. The pairing of device 102 and device 104 may take place over a peer-to-peer interface when both devices are in the on state. During pairing, device 102 and device 104 exchange information such as identification information including security keys, and channel information. The information corresponding to device 102 is stored in device 104 and the information corresponding to device 104 is stored in device 102 as paired device data. During the pairing process, the pairing may be accepted and validated by an acceptance of the pairing at a user interface on one or both devices. Once paired, device 102 and device 104 will scan for one another when in the on state to locate one another and connect over the peer-to-peer interface. When data transfer is to take place between the two devices, device 102 and device 104 may use the information already stored during pairing to quickly set up a data channel. In another implementation, the pairing may be a transient or one time pairing. In the transient pairing, a key may be entered upon pairing that only allows one connection or a selected number of connections to be made based on a pairing information exchange. This provides an advantage when a user of device 102 only wants to connect and synchronize device 104 for one or a limited number of times, for example if device 104 is a borrowed device.

In an implementation, the pairing at 202 may be performed over Wi-Fi Direct to pair device 102 and device 104 for a Wi-Fi Direct data connection over interface channel 122. In other embodiments, the pairing for a Wi-Fi Direct data connection over interface channel 122 may be performed using a near field communications (NFC) interface or Bluetooth interface for initial information exchange used for the Wi-Fi Direct pairing. For example, the pairing of device 102 and device 104 may be performed using NFC to exchange Wi-Fi Direct pairing data, and subsequent to pairing, the data channel used for synchronization of applications on device 104 through device 102 may be implemented over Wi-Fi Direct on interface channel 122. In other implementations, the pairing may be performed by any other process that allows device 102 and device 104 to exchange information that is used to pair the devices and configure a data channel on interface channel 122 to perform the embodiments described herein. In another example implementation the pairing may be performed to set up a Bluetooth paired connection for data transfer over interface channel 122.

Once paired with device 102, device 104 may access the communication networks 108 until device 104 enters sleep mode at 204. Device 104 may enter sleep mode when a timeout occurs, for example, when no user input is detected at device 104 and no transmissions, such as messages, are received or sent within a predetermined time period. Device 104 may also enter sleep mode when a user switches device 104 to sleep mode.

Also, once paired with device 104, device 102 may be used until device 102 enters a tether state at 206. Upon entering the tether state, device 102 is operable to act as a tethering node and provide a network connection over interface 114 to other devices such as device 104. At 208, device 102 sends a wake-up message to sleeping device 104 on interface 122. The wake-up message at 208 may be sent automatically upon entering the tethering state, or sent by providing, upon entering the tethering state, a prompt at a user interface of device 102 querying the user if the user wants to synchronize device 104. The user may input an affirmative response and the wake-up message will be sent in response.

In one implementation, the wake-up message may comprise a Wi-Fi wakeup packet, for example a wake on LAN packet (WOL packet) or "magic packet" sent over a Wi-Fi Direct channel on interface 122 to Wi-Fi Direct paired device 104. In other embodiments the wakeup message may be sent from device 102 to paired device 104 using other formats when device 102 and device 104 are paired over interface 122 by other technology. For example, the message may be sent as a Bluetooth message when device 102 and device 104 are paired on a Bluetooth interface. Wake-up message as used in this disclosure means any type of communication or message that wakes or changes a mode of a device receiving the message from a sleep or power saving mode to an active or on state.

At 210, device 104 receives the wakeup message on interface 122 while in sleep mode. At 212, device 104 wakes in response to receiving the wakeup message. At 214 a connection is set up between device 104 and device 102 on the previously paired interface 122 and device 102 provides a network connection for device 104 over interface 114. During connection set-up device 102 and device 104 each exchange appropriate data and information for configuring interface channel 122 and interface 114 on the network connection for device 104. The connection set-up may be initiated by device 104 in response to receiving the wakeup message while in sleep mode and discovering the availability of previously paired device 102 on interface 122. Alternately, device 102 may initiate the connection set-up after discovering the availability of device 104 on interface 122 subsequent to device 104 awakening in response to receiving the wakeup message.

At 216, selected applications on device 104 are synchronized over the tethered network connection. After synchronization of applications on device 104 is complete, the process moves to 218. At 218, device 104 determines that the synchronization is complete and returns to sleep mode.

Figure 3A:
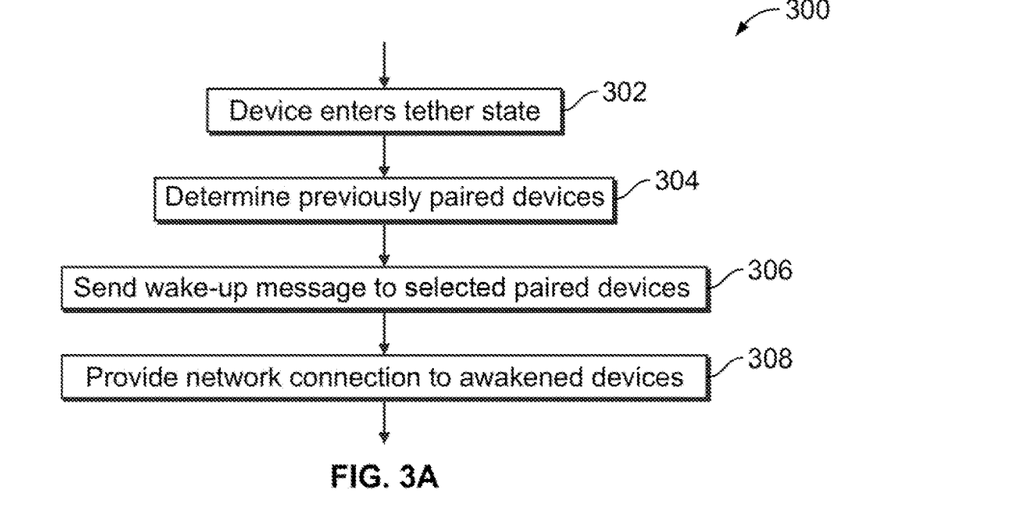
FIG. 3A is a flow diagram illustrating example operations of device 1 in the flow diagram of FIG. 2.
Figure 3B:
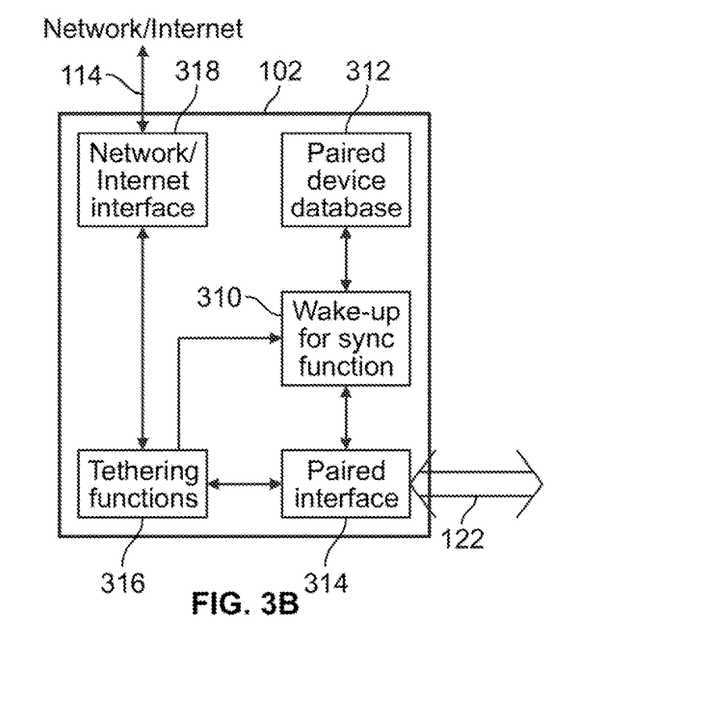
FIG. 3B is a simplified functional block diagram of an example implementation of a device operable to perform the operations of FIG. 3A.

Referring now to FIG. 3A, therein is a flow diagram illustrating example operations performed by a device providing a tethering connection according to FIG. 2. FIG. 3A may be explained with reference to 3B which is a simplified functional block diagram of an example implementation of a device for performing the operations of FIG. 3A. FIG. 3B shows device 102, which may represent device 102 of FIG. 1, having a network/internet interface function 318, a tethering function 316, a paired device database 312, wake-up/sync functions 310 and a paired interface function 314. The network interface function 318 provides connections to a network and/or the internet over interface 14 and the paired interface function 314 provides peer to peer connections to one or more other devices, such as device 104.

The process of FIG. 3A begins at 302 where device 102 enters a tether state. Device 102 may enter the tether state automatically, for example, upon being powered up or upon leaving sleep mode when a network connection becomes available to device 102 over interface 114. Device 102 may also enter the tether mode when already powered up and upon detecting that a network connection over interface 114 has become available. In another implementation, device 102 may enter the tether state in response to a user selecting to enter tether mode. For example, a user may respond to a user interface prompt indicating that a network connection has become available for tethering and asking if the user wants to connect. Tethering state or tethering as used in this disclosure includes any operating state or mode in which a tethering device is operable to provide the functions of an access point or node for allowing another device to connect to a network through the tethering device. In response to entering the tethering state, tethering function 316 informs wake-up/sync function 310 that the tethering state has been entered.

At 304, device 102 determines devices previously paired with device 102 which may be sent a wake-up message. Wake-up/sync function 310 may query paired device database 312 for information on previously the paired devices to which wakeup messages may be sent. The information on previously paired device may include information identifying all previously paired devices or information that identifies only specific previously paired devices. In an implementation, upon entering a tethering state, wake-up/sync function 310 may determine a selection of one or more previously paired devices, such as device 104, from database 312. In one implementation, the devices may be preselected or all previously paired devices may be selected by default. This may be done by configuring the wake-up/sync function 310 through an exchange of setup information with paired devices upon pairing or at other times previous to device 102 entering the tether state at 302. In one implementation, the wake-up/sync function 310 may determine the selected paired devices from data stored in database 312 automatically upon entering the tethering state.

Next at 306, device 102 sends a wake-up message to the selected paired devices obtained by the determination at 304. The sending of the wake-up message at 306 may be automatically initiated by wake-up/sync function 310 at paired interface 314 when device 102 has entered the tethering mode at 302 and the selected paired devices to which the wake-up message is to be sent have been determined at 304. In this implementation, device 102 may be configured to receive input at a user interface allowing a device user to select a feature, for example, as a UI property, prior to the performance of process 300, that preconfigures device 102 to automatically send the wakeup message to the at least one second device upon entering the tethering state. In this implementation the operations of process 300 are done automatically without any user prompts. Alternately, the sending of the wake-up message may be initiated in response to a prompt at a user interface querying a user of device 102 if the user wants to synchronize a paired device as determined at 304, such as device 104. In this implementation, device 102 may be configured to receive input at a user interface to select and activate a feature, such as a UI property, prior to the performance of process 300. Selecting and activating the feature will cause the first device to present a selection choice to a user at the first device upon entering a tethering state. When presented with the selection choice at the user interface, the user may choose whether or not to send a wakeup message to the at least one second device, such as device 304, at the user interface.

In another implementation, the sending of the wake-up message at 306 may be triggered by the enablement or launching of a Wi-Fi application on device 102. The Wi-Fi application may be, for example, a mobile Hotspot application that allows device 102 to connect to a specific hotspot while traveling. In implementations the enablement or launching of the Wi-Fi application may be done automatically upon detection of a network associated with the application or triggered by a user launching the application. The user may then choose to synchronize applications on one or more of the previously paired devices determined at 304, such as device 104, by selecting the devices at a user interface of the application. Alternately, the enablement or launching of the Wi-Fi application may trigger the process of 300 to be automatically performed by device 102.

The wake-up message at 306 may be sent according to the previous pairing of device 102 and device 104. For example, if the pairing was performed for Wi-Fi Direct the wake-up message may comprise a Wi-Fi Wake on LAN packet (WOL packet) or Wi-Fi "magic packet". In another embodiment, for example, the wake-up message may be sent as a Bluetooth message when device 102 and device 104 are paired on a Bluetooth interface.

Next, at 308, device 102 provides a network connection to the tethered devices through the tethered network connection. The network connection may be configured by tethering function 316 communicating with tethered devices, such as device 104, that have woken in response to receiving the wake-up message sent in operation 306.

Figure 4A:
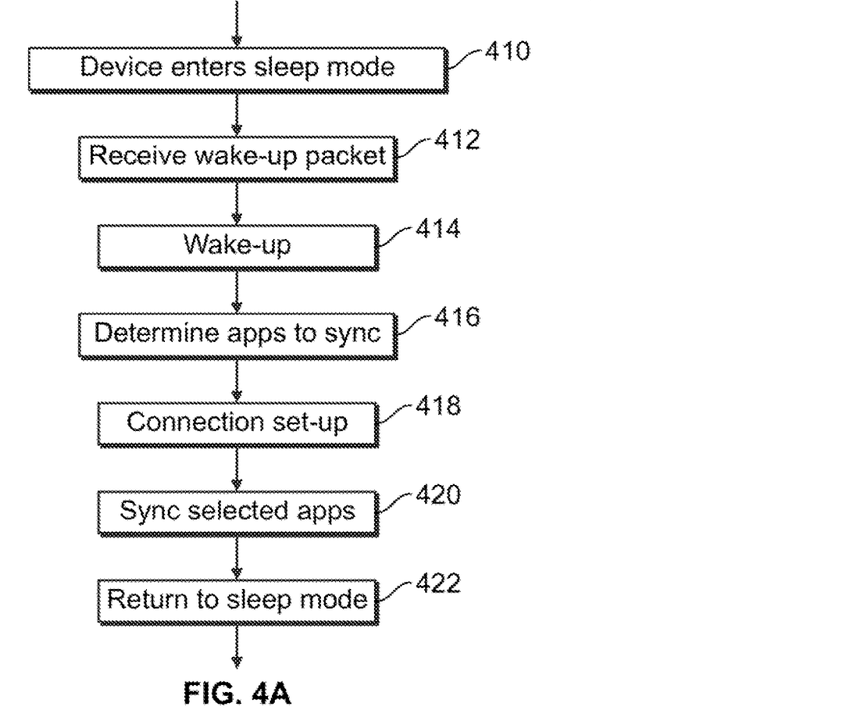
FIG. 4A is a flow diagram illustrating example operations of device 2 in the flow diagram of FIG. 2.
Figure 4B:
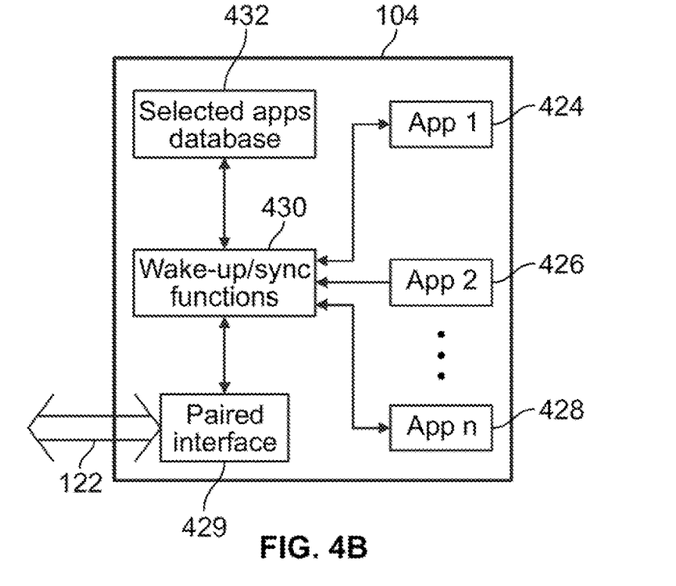
FIG. 4B is a simplified functional block diagram of an example implementation of a device operable to perform the operations of FIG. 4A; and, FIG. 5 is a simplified schematic block diagram of an example implementation that may be used for the devices of FIG. 3B and FIG. 4B.

Referring now to FIG. 4A, therein is a flow diagram illustrating example operations performed by a device synchronizing applications according to FIG. 2. FIG. 4A may be explained with reference to 4B which is a simplified functional block diagram of an example implementation of a device for performing the operations of FIG. 4A. FIG. 4B shows device 104, which may represent device 104 of FIG. 1, having selected application database 432, wake-up/sync functions 430, paired interface function 429 and applications App-1 424 through App-n 428. Applications App-1 424 through App-n 428 may include any type of application or data on device 104 that may be synchronized with network/internet databases or applications, or applications on other devices. These applications may include, for example, email or messaging applications, calendar applications, document sharing applications, news/media applications, social network applications, or any other type of applications that may with associated databases and applications located remote to device 104. Paired interface function 429 provides connections to one or more other devices, such as device 102, over interface channel 122.

The process of FIG. 4A begins at 410 where device 104 enters sleep mode. Device 104 may enter sleep mode when a timeout occurs, for example, when no user input is detected at device 104 and no transmissions, such as messages, are received or sent within a predetermined time period. Device 104 may also enter sleep mode when a user switches device 104 to sleep mode. At 412, device 104 receives a wake-up message sent from device 102 over interface 122 at paired interface function 429. The wake-up message may be received according to the previous pairing of device 102 and device 104. For example, if the pairing was performed for Wi-Fi Direct the wake-up message may comprise a Wi-Fi Wake on LAN packet (WOL packet) or Wi-Fi "magic packet". In another embodiment, for example, wake-up the message may be sent as a Bluetooth message when device 102 and device 104 are paired on a Bluetooth interface.

At 414, device 104 awakens. At 416, in response to device 104 receiving the wake-up message, wake-up/sync function 430 queries selected application database 432 to determine which of applications App-1 424 through App-n 428 are to be synchronized upon wake-up when a tethering connection is available. In an implementation, a pre-selected subset of the applications on device 104 may be synchronized. For example, a preselected subset of applications may be designated by the user of device 104 through a user interface to be synchronized when tethering occurs. If device 104 is a company device, a device administrator may manage selection of a preselected subset of applications for synchronization. In other implementations defaults may be used for selecting applications for synchronization. For example, all applications, or only applications of a certain type, such as messaging applications or work related applications on device 104 may be selected for synchronization.

At 418, paired interface function 429 of device 104 performs connection setup with paired interface function 314 of device 102 as was described for operation 214 of FIG. 2. After a connection is set up over channel 122 on paired interfaces 429 and 314, device 104 communicates with tethering function 316 on device 102 to configure a network connection. At 420, Wake-up/sync function 430 then initiates synchronization of selected applications of applications Ap-1 424 through App-n 428 with appropriate network databases. When synchronization is complete, Wake-up/sync function 430 may initiate the return of device 104 to sleep mode.

Figure 5:
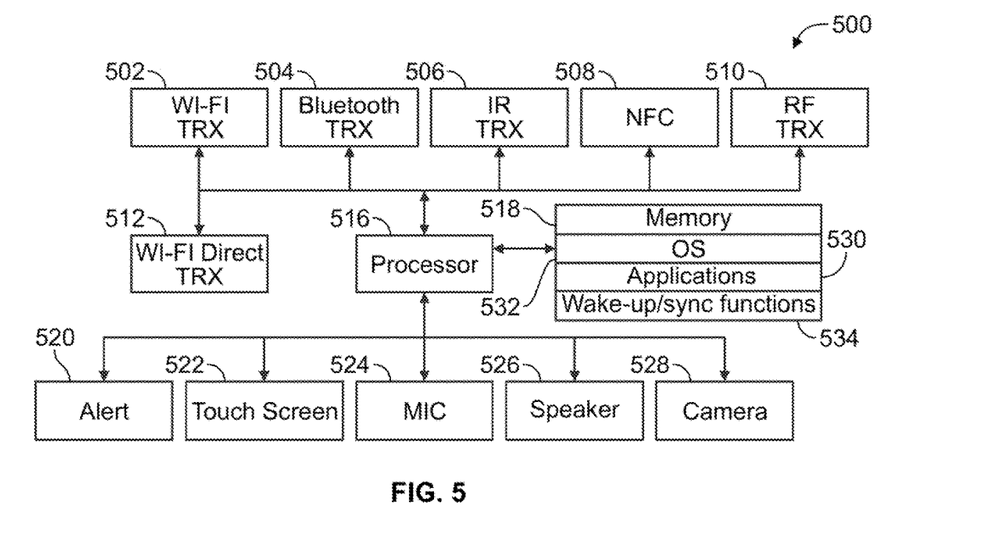

Referring now to FIG. 5, therein is a simplified block diagram of an example implementation of a device. Device 500 represents a possible implementation of device 102, device 104, device 106, or any other device that may operate in network 100 according to the embodiments disclosed herein. Device 500 includes user interfaces (UIs) that may include, for example, a touch screen/keypad 522, a microphone 524, speakers 526, or camera 528 which may receive inputs and provide outputs to and from device 500 that are utilized in executing implementations of the embodiments. Device 500 includes processor 516 and memory/storage 518 which is shown as including program code or instructions for operating system (OS) 532, program code or instructions for applications 530 and program code or instructions for wake-up/sync functions 534. In one example implementation of device 500, the code or instructions for wake-up/sync functions 534 are configured to, when executed, cause the processing unit 526 to control device 500 to perform operations as shown in and described for device 102 in the embodiments of FIGS. 2 and 3A-3B. In another example implementation of device 500, the code or instructions for wake-up/sync functions 534 are configured to, when executed, cause the processing unit 526 to control device 500 to perform operations as shown in and described for device 104 in the embodiments of FIGS. 2 and 4A-4B.

Memory 518 may be implemented as any type of computer readable storage media in device 500, including non-volatile and volatile memory. Memory 518 may include data bases associated with implementations of the embodiments disclosed herein, such as paired device database 312 of FIG. 3B or selected apps database of FIG. 4B. Memory 518 also may include data such as messaging data, media data, camera photos and videos, contact data, calendar data, and other files used in the operation of applications on device 500 and that may be synchronized according to the embodiments. Processor 516 may comprise one or more processors, processing units, controllers, or other control circuitry or any combination of processors and control circuitry. Processor 516 provides overall control of device 500 and the other functional blocks shown in FIG. 5 by implementing instructions and code in memory 518 to provide necessary functions for operation of device 500.

Device 500 includes transceivers (TRXs) operating in different frequency bands as shown by Wi-Fi TRX 502, Bluetooth TRX 504, infrared (IR) TRX 506, near filed communications (NFC) TRX 508, radio frequency (RF) (cellular) TRX 510 and Wi-Fi Direct TRX 536. In the embodiments, device 500 and its transceivers may be operable to use one or more spectrum allocations that are allowed in the frequency bands of each transceiver according to relevant standard specifications. The transceivers 502-512 may be utilized to provide the implementations of the tethering network connections and paired interface connections for embodiments as described herein.

The example embodiments disclosed herein may be described in the general context of processor-executable code or instructions stored on memory that may comprise one or more computer readable storage media (e.g., tangible non-transitory computer-readable storage media such as memory 518). As should be readily understood, the terms "computer-readable storage media" or "non-transitory computer-readable media" include the media for storing of data, code and program instructions, such as memory 518, and do not include portions of the media for storing transitory propagated or modulated data communication signals The embodiments include a first device comprising at least one processor and memory, including code, the code executable to cause the at least one processor to control the first device to receive a wakeup message while in sleep mode, the wakeup message sent from a second device operable to provide a tethered network connection and, in response to receiving the wakeup message, synchronize at least one application over the tethered network connection. The code may be further executable to cause the at least one processor to control the first device to, in response to receiving the wakeup message, determine at least one application for synchronization. The first device may also comprise a database and the code may be further executable to cause the at least one processor to control the first device to determine at least one application for synchronization by accessing the database, wherein the database indicates at least one application to be synchronized. The first device may further comprise an interface and the code may be further executable to cause the at least one processor to control the first device to receive input at the interface that indicates at least one application to be synchronized and, store the indication of the at least one application to be synchronized in the database. The first device may also comprises a user interface and the at least one application to be synchronized may comprise a subset of a plurality of applications on the first device.

The embodiments also include the first device wherein the code is further executable to cause the at least one processor to control the first device to, in response to receiving the wakeup message, enter an awake mode and, return to the sleep mode when synchronization of the at least one application over the tethered network connection is completed. The wakeup message may comprise a wakeup message sent based on a previous pairing of the first device and the second device, the first device and the second device may have been previously paired on a peer-to-peer interface, and the wakeup message may include a wakeup packet sent on the peer-to-peer interface.

The first device may include code is further executable to cause the at least one processor to control the first device to set up a data channel with the second device on the peer-to-peer interface to provide the tethered network connection to the first device through the second device. The data channel on the peer-to-peer interface may be a Wi-Fi Direct data channel. The second device may operable to provide the tethered network connection to a first type network or a second type network, and the first device may include code executable to cause the at least one processor to control the first device to synchronize the at least one application only if the tethered network connection is to the first type network.

Other embodiments include a first device comprising at least one processor and memory, including code, the code executable to cause the at least one processor to control the first device to determine that the first device has entered a tethering state and send a wakeup message to at least one second device, wherein the at least one second device was previously paired with the first device. The first device may also include a user interface and the code may be executable to configure the at least one processor to control the first device to receive input at the user interface and send the wakeup message in response to receiving the input at the user interface. The code may be further executable to cause the at least one processor to control the first device to receive the input at the user interface for enabling a Wi-Fi application and send the wakeup message in response to the enabling of the Wi-Fi application. The code may also be further executable to configure the at least one processor to control the first device to receive the input at the user interface for selecting a feature that causes the first device to automatically send the wakeup message to the at least one second device upon entering a tethering state. The code may be further executable to cause the at least one processor to control the first device to receive first input at the user interface, the first input selecting a feature that causes the first device to present a selection at the user interface, upon entering a tethering state, wherein the selection allows the user to choose whether to send a wakeup message to the at least one second device, present the selection to a user upon entering the tethering state, receive a choice of the selection as second input, and send the wakeup message in response to receiving the second input.

The first device may further comprises a user interface and the processor may control the first device to, in response to the determination that the first device has entered a tethering state, determine at least one second device, wherein the at least one second device was previously paired with the first device, receive an input at the user interface indicating a selected second device of the at least one second device, and send the wakeup message to the selected second device of the at least one second device determined to be previously paired to the first device. The code may be further executable to cause the at least one processor to control the first device to determine the at least one device that was previously paired with the first device by accessing a database stored in the memory, the database indicating at least one second device that was previously paired with the first device that is to be sent a wakeup message on entering the tethering state.

The processor may further control the first device to send the wakeup message on a peer-to-peer interface, set up a data channel with the at least one previously paired second device on the peer-to-peer interface, and provide a network connection to the at least one previously paired second device. The data channel between the first device and second device on the peer-to-peer interface may be a Wi-Fi Direct data channel. The first device may operable to provide the tethered network connection to a first type network or a second type network, and the first device may include code executable to cause the at least one processor to control the first device to send the wake-up message only if the tethered network connection is to the first type network.

The embodiments also include a method for synchronizing applications on a first device comprising receiving a wakeup message while in sleep mode, the wakeup message sent from a second device operable to provide a tethered network connection, and, in response to receiving the wakeup message, determining at least one application for synchronization. The determining of the method may comprise determining at least one application for synchronization by accessing a database that indicates at least one application that is to be synchronized over a tethered connection upon entering wakeup mode. The method may also further comprising receiving input at an interface of the first device that indicates at least one application to be synchronized over a tethered connection upon entering wakeup mode, wherein the at least one application comprises a subset of a plurality of applications on the first device.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A first device comprising:
   at least one interface;
   at least one processor and memory, including code, the code executable by the at least one processor to control the first device to:
   receive a wakeup message through the at least one interface while the first device is in a sleep mode, the wakeup message sent from a second device operable to provide a tethered network connection; and,
   in response to receiving the wakeup message;
   synchronize at least one application through the at least one interface over the tethered network connection to synchronize data associated with the at least one application on the first device with data in a network database.

2. The first device of claim 1, wherein the code is further executable by the at least one processor to control the first device to, in response to receiving the wakeup message:
   determine the at least one application for synchronization.

3. The first device of claim 1, wherein the first device comprises a device database and the code is further executable to cause the at least one processor to control the first device to determine the at least one application for synchronization by accessing the device database, wherein the device database indicates the at least one application is to be synchronized.

4. The first device of claim 1, wherein the at least one interface comprises at least one communication interface, the first device further comprises a user interface, and the code is further executable by the at least one processor to control the first device to:
   receive input at the user interface that indicates the at least one application to be synchronized; and,
   store the indication of the at least one application to he synchronized in the device database.

5. The first device of claim 4, wherein the at least one application to he synchronized comprises a subset of a plurality of applications on the first device.

6. The first device of claim 1, wherein the code is further executable by the at least one processor to control the first device to, in response to receiving the wakeup message:
   enter an awake mode; and,
   return to the sleep mode when synchronization of the at least one application over the tethered network connection is completed.

7. The first device of claim 1, wherein the wakeup message comprises a wakeup message sent based on a previous pairing of the first device and the second device.

8. The first device of claim 7, wherein the at least one interface comprises a peer-to-peer interface, and the first device and the second device have been previously paired on the peer-to-peer interface and the wakeup message includes a wakeup packet sent on the peer-to-peer interface.

9. The first device of claim 8, wherein to synchronize the at least one application over the tethered network connection, the code is further executable by the at least one processor to control the first device to set up a data channel with the second device on the peer-to-peer interface to provide the tethered network connection to the first device through the second device.

10. The first device of claim 9, wherein the data channel on the peer-to-peer interface is a Wi-Fi Direct data channel.

11. The first device of claim 1, wherein the second device is operable to provide the tethered network connection to a first type network or a second type network, and the code is executable by the at least one processor to control the first device to synchronize the at least one application only if the tethered network connection is to the first type network.

12. A first device comprising:
   at least one communication interface;
   at least one processor and memory including code, the code executable by the at least one processor to control the first device to:
   enter a tethering state;
   send a wakeup message to at least one second device that is in a sleep mode on the at least one communication interface, wherein the at least one second device was previously paired with the first device; and,
   provide a tethered network connection to the at least one second device.

13. The first device of claim 12, wherein the first device further comprises a user interface and the code is further executable by the at least one processor to control the first device to:
   receive input at the user interface; and, send the wakeup message in response to receiving the input at the user interface.

14. The first device of claim 12, wherein the first device further comprises a user interface and wherein the code is further executable by the at least one processor to control the first device to:
receive input at the user interface, the input enabling a Wi-Fi application; and, send the wakeup message in response to the enabling of the Wi-Fi application.

15. The first device of claim 12, wherein the first device further comprises a user interface and the code is further executable by the at least one processor to control the first device to:
receive input at the user interface, the input selecting a feature that configures the first device to automatically send the wakeup message to the at least one second device upon entering a tethering state; and,
send the wakeup message in response to entering the tethering state.

16. The first device of claim 12, wherein the first device further comprises a user interface and the code is further executable by the at least one processor to control the first device to:
receive first input at the user interface, the first input selecting a feature that configures the first device to present a selection at the user interface upon entering a tethering state, wherein the selection allows the user to choose whether or not to send a wakeup message to the at least one second device;
present the selection to a user upon entering the tethering state;
receive a choice of the selection as second input; and,
send the wakeup message in response to receiving the second input.

17. The first device of claim 12, wherein the first device further comprises a user interface and the processor controls the first device to, in response to the determination that the first device has entered a tethering state:
determine the at least one second device;
receive an input at the user interface indicating a selected second duce of the at least one second device; and
send the wakeup message to the selected second device.

18. The first device of claim 12, wherein the code is further executable by the at least one processor to control the first device to:
determine at least one device that was previously paired with the first device by accessing a database, the database indicating the at least one first device that was previously paired with the first device is to be sent a wakeup message on entering the tethering state.

19. The first device of claim 12, wherein the at least one communication interface comprises a peer-to-peer interface, and, the processor further controls the first device to, set up a data channel with the at least one second device on the peer-to-peer interface, and provide the tethered network connection to the at least one second device on the peer-to-peer interface.

20. The first device of claim 19, wherein the data channel on the peer-to-peer interface is a Wi-Fi Direct data channel.

21. The first device of claim 12, wherein the first device is operable to provide the tethered network connection to a first type network or a second type network, and the code is executable by the at least one processor to control the first device to send the wake-up message only if the tethered network connection is to the first type network.

22. A method for synchronizing at least one application on a first device comprising:
receiving a wakeup message while in sleep mode, the wakeup message sent from a second device configured to provide a tethered network connection; and,
in response to receiving the wakeup message;
synchronizing the at least one application over the tethered network connection.

23. The method of claim 22 further comprising, in response to receiving the wakeup message:
determining the at least one application for synchronization.

24. The method of claim 23, wherein the determining further comprises:
receiving input at an interface of the first device that indicates the at least one application to be synchronized, wherein the at least one application comprises a subset of a plurality of applications on the first device.

* * * * *